Patented Feb. 17, 1942

2,273,636

UNITED STATES PATENT OFFICE 2,273,636

PROCEDURE FOR THE DRESSING AND SOFTENING OF CELLULOSE PRODUCTS

Walter Gellendien, Berlin-Charlottenburg, and Johann Eggert, Berlin, Germany, assignors, by mesne assignments, to "Patchem A.-G. zur Beteiligung an Patenten und Sonstigen Erfindungsrechten auf Chemische Verfahren," Zurich, Switzerland, a corporation of Switzerland No Drawing. Application January 31, 1935, Serial No. 4,327. Renewed March 4, 1939. In Germany January 31, 1934

4 Claims. (Cl. 91—68)

It is known that regenerated cellulose products and particularly those obtained from aqueous cellulose solutions, are generally treated with glycerol for the purpose of impregnating or softening. Thus, for the impregnation and in order to prevent the shrinking one generally employs concentrated glycerol solutions, whereas for softening the diluted glycerol solutions are preferred.

Now the glycerol is very hygroscopic and therefore in applying it for those purposes it shows several drawbacks. When used as softening agent it renders the cellulose products extremely sensitive to moisture so that even the slightest variations of the air-humidity are sufficient to soften the products most disadvantageously and to cause them to swell, so that the cellulose foils form creases and bosses and their clearness and transparency suffer considerably. Since the cellulose products treated with glycerol contain often 9 to 12% of glycerol, they also incline to putrefaction and decomposition if they are stored in moist air.

As an impregnation agent to prevent the shrinkage of cellulose products the glycerol, owing to its hygroscopicity, is suitable but in a very restricted sense, because in a moist climate, e. g. in the tropics the glycerol-impregnation draws so much water that the thus treated products get quickly spoiled. Besides the cellulose products impregnated with glycerol incline to sticking together so that they lose their value.

Now it has been found that those drawbacks can be eliminated in using in the place of the glycerol its ethers or esters. The sensitiveness to water of the glycerol diminished by the alkoxylation or esterification respectively in the same proportion as the hydroxyl-groups are neutralized, even until the complete water-insolubility. Of a similar influence is also the molecular weight of the ether or ester groups respectively, because the water-solubility of the glycerol-esters or glycerol-ethers respectively is reduced according to the molecular weight of the introduced radical. It has also been found that glycerol-ethers or glycerol-esters respectively, which are still of a certain water-solubility or which by means of alcohols such as e. g. ethyl alcohol can be rendered soluble in water, show a particularly good dressing and softening effect. Finally the glycerol-esters with amino-groups are likewise most useful for the said purposes. The aforesaid compounds are particularly excellent softening and impregnation agents without showing the drawback of hygroscopicity.

By a suitable combination or mixture of the mentioned ethers alone or with esters in an aqueous, alcoholic or alcoholic-watery solution it is possible to provoke with the regenerated cellulose products the properties desired for the dressing and the like whereby these products do not show the drawbacks of the cellulose products dressed with glycerol. The said combinations are also very suitable for the impregnating of undried cellulose products in order to prevent the shrinkage before use. Also with such a subsequent treatment the sensitiveness to water of the treated products may be adjusted to one's liking.

Among the ethers of the glycerol to be considered for the purposes of the present procedure, the following ones may be mentioned for example: glycerol-monomethylether, poly-glycerol-laurylether, glycerol-monocyclohexylether, furthermore glycerol-dicetylether, glycerol-diphenylether, glycerol-trinaphthenylether and the like. As suitable esters of the glycerol one may use e. g. glycerol-monoacetate, glycerol-monolaurate, adipicacid-glycerolester, triacetin. Furthermore, instead of the glycerol and its polymerisation-products also other poly-valent alcohols such as alkyleneglycols or also four- or more-valent alcohols such as e. g. penta-erythrite are to be considered.

*Example 1*

To make soft and elastic cellulose-foils out of cellulose-xanthogenate one passes the ready film in a humid or half-dried state through a warm water impregnation-bath of about 35° and containing 1.5% of triacetin besides 1.5% of glycerol-monomethylether. The film is then dried in the usual way and cut to the desired size. The thus obtained foils show an excellent flexibility and also during a long storage they remain smooth, clear and transparent. Those foils are able to offer resistance to the reaction of aqueous vapour. Instead of the said impregnation-agent it is also possible to employ merely a 30% solution of glycerol-monomethylether or of glycerol-monoethylether.

*Example 2*

Humid or half-dried regenerated cellulose-products obtained according to the cupric oxide-ammonia-cellulose-procedure are treated, e. g. in the form of ribbons, with an alcoholic-water solution (about 20 to 25% of ethylalcohol) containing 4% of glycerol-dimethylether and 2% of glycerol-monomethylether. The cellulose products are then subject to the further treatment and after the drying they are of an excellent elasticity and softness. Instead of the above impregnation-bath one may employ with a similar good success an alcoholic-water solution of 3% of glycerol-monoethylether and 2% of polyglycerol-dodecylether.

*Example 3*

Artificial guts or tubes, made of cellulose according to the well known method, are impregnated in an aqueous bath containing 1.5% of glycerol-mononaphthenylether, 2% of glycolmonomethylether and 0.8% of triacetin. The products impregnated with this liquid are of a good elasticity and also during a long storage they do not incline to shrinkage nor to sticking together. Instead of the above indicated impregnation-bath-admixture one may likewise use a mixture of 4 parts of glycerol-monomethylether and 1 part of isopropylalcohol or a mixture of 3 parts of polyglyceroldodecylether, 2 parts of glycerol-monoethylether and 1 part of isopropylalcohol.

What we claim is:

1. Agents for the dressing and softening of regenerated cellulose products consisting of an aqueous impregnation-liquid containing 1.5% of glycerol-monomethylether and 1.5% of triacetine.

2. Agents for the dressing and softening of regenerated cellulose products consisting of a watery-alcoholic impregnation-liquid containing 3% of glycerol-monoethylether.

3. Agents for the dressing and softening of regenerated cellulose products consisting of a watery-alcoholic impregnation-liquid containing 4% of glycerol-dimethylether and 2% of glycerol-monomethyl-ether.

4. The method of treating regenerated cellulose products for dressing and softening the same which comprises impregnating the regenerated cellulose products after they are formed, but before drying, with an alcoholic solution containing an ether selected from the group consisting of glycerol mono-methyl ether, glycerol di-methyl ether, glycerol mono-ethyl ether and glycerol di-cetyl ether.

WALTER GELLENDIEN.
JOHANN EGGERT.